No. 627,912. Patented June 27, 1899.
J. F. A. FARFAN.
BICYCLE BRAKE.
(Application filed Mar. 15, 1898.)
(No Model.)
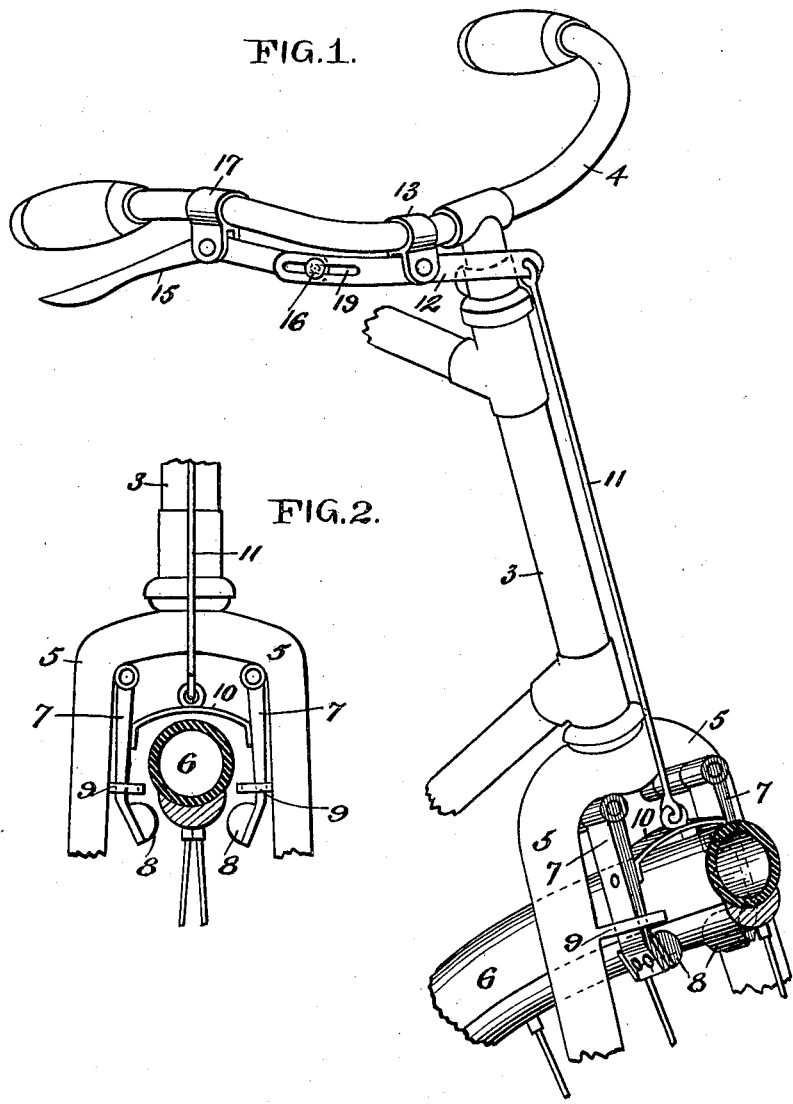
WITNESSES:
Donn Twitchell
Isaac B. Owens
INVENTOR
Joseph F. A. Farfan.
BY Munn & Co
ATTORNEYS.

UNITED STATES PATENT OFFICE.

JOSEPH F. A. FARFAN, OF PORT-OF-SPAIN, TRINIDAD.

BICYCLE-BRAKE.

SPECIFICATION forming part of Letters Patent No. 627,912, dated June 27, 1899.

Application filed March 15, 1898. Serial No. 673,941. (No model.)

*To all whom it may concern:*

Be it known that I, JOSEPH F. A. FARFAN, a resident of Port-of-Spain, Trinidad, British West Indies, have invented a new and Improved Bicycle-Brake, of which the following is a full, clear, and exact description.

This invention relates to a bicycle-brake in which the brake-shoe is carried by the fork of the steering-head and arranged to engage the tire or rim of the wheel, the brake-shoe being operated by a lever on the steering-handle, which lever is flexibly connected with the brake-shoe.

The invention consists in the particular construction and arrangement of parts as hereinafter fully described, and pointed out in the claims.

Reference is to be had to the accompanying drawings, forming a part of this specification, in which similar characters of reference indicate corresponding parts in both figures.

Figure 1 is a perspective view of the improvement, and Fig. 2 is a front elevation of the same.

The invention is shown attached to a bicycle having the usual steering-head 3, with the handle-bar 4 at the top thereof and the fork 5 for the front wheel 6 at the bottom thereof. The front wheel comprises a rim and tire, as usual. Between the upper ends of the arms of the fork 5 are pivoted the two brake-arms 7, whose lower free ends are bent inward and provided with brake-shoes 8, which are adapted to engage opposite sides of the rim of the wheel. The arms are guided by recessed lugs 9, projecting inward from the respective arms of the fork 5. Extending between the arms 7 and secured at its ends to the same is a spring 10, which normally holds the arms 7 in the position shown in Fig. 2, but which when flexed draws the arms 7 toward each other and applies the brake. To flex the spring to apply the brake, I preferably employ the means shown in the drawings, which consists of the cord 11, having its lower end secured to the spring 10 and its upper end to one end of the lever 12, fulcrumed to the clip 13, attached to the handle-bar, the other end of said lever being provided with a slot 14, receiving a pin 16 on a hand-lever 15, fulcrumed to a clip 17 on the handle-bar. The hand-lever 15 extends approximately parallel with the handle-bar in position to be grasped by the rider, so that by operating the said lever a pull will be exerted upon the cord and the spring 10 flexed to apply the brake.

Having thus described my invention, I claim as new and desire to secure by Letters Patent—

1. In a bicycle-brake, the combination of two arms pivoted at their upper ends to the fork and having their lower ends provided with brake-shoes for engaging the inner face of the rim of the wheel, a spring between the said arms and having its ends secured thereto, an operating-lever, and a connection between the lever and spring, substantially as described.

2. In a bicycle-brake, the combination with the fork provided with recessed lugs on their inner faces, of two arms pivoted to the members of the fork and having their lower ones guided by said lugs and bent inwardly and provided with brake-shoes, a spring between the arms and having its ends secured thereto, an operating-lever, and a flexible connection between the lever and spring, substantially as described.

JOSEPH F. A. FARFAN.

Witnesses:
C. ANDERSON,
C. SMITH.